US008136988B2

(12) United States Patent
Geren et al.

(10) Patent No.: US 8,136,988 B2
(45) Date of Patent: Mar. 20, 2012

(54) METHODS AND SYSTEMS FOR PASSIVE, WIRELESS TEMPERATURE MONITORING

(75) Inventors: William Preston Geren, Shoreline, WA (US); Brian Kenneth Kormanyos, Edmonds, WA (US); Kathryn A. Masiello, Evanston, IL (US); Gerardo Pena, Seattle, WA (US)

(73) Assignee: The Boeing Company, Chicago, IL (US)

( * ) Notice: Subject to any disclaimer, the term of this patent is extended or adjusted under 35 U.S.C. 154(b) by 557 days.

(21) Appl. No.: 12/354,543

(22) Filed: Jan. 15, 2009

(65) Prior Publication Data

US 2010/0177801 A1 Jul. 15, 2010

(51) Int. Cl.
*G01K 11/26* (2006.01)
*G01K 7/34* (2006.01)
*G01K 5/52* (2006.01)

(52) U.S. Cl. ......... 374/187; 374/184; 374/166; 374/137
(58) Field of Classification Search .................. 374/184, 374/187, 117, 118, 119, 208, 166, 137, 110, 374/111, 112, 113, 115, 55, 100, E11.011
See application file for complete search history.

(56) References Cited

U.S. PATENT DOCUMENTS

| | | | | |
|---|---|---|---|---|
| 3,774,089 | A | | 11/1973 | Lewis |
| 4,434,451 | A | * | 2/1984 | Delatorre .................... 361/283.4 |
| 5,492,016 | A | * | 2/1996 | Pinto et al. ...................... 73/724 |
| 6,031,944 | A | * | 2/2000 | Youngner ........................ 385/12 |
| 6,217,211 | B1 | * | 4/2001 | Hesky ............................... 374/4 |
| 6,388,255 | B1 | * | 5/2002 | Di Maio et al. ............ 250/338.2 |
| 7,637,656 | B2 | * | 12/2009 | Billington et al. ............ 374/120 |
| 2004/0122494 | A1 | * | 6/2004 | Eggers et al. .................. 607/103 |
| 2006/0271661 | A1 | * | 11/2006 | Qi et al. .......................... 709/223 |

OTHER PUBLICATIONS

C. T. Kelley, "Iterative Methods for Linear and Nonlinear Equations", 1995, Society for Industrial and Applied Mathematics, pp. 1-172.*
Wang, Z. et al; Issues in Integrated Circuit Design for UHF RFID; IEEE International Workshop on Radio-Frequency Integration Technology; Dec. 9-11, 2007; pp. 322-328.
Shenai, K. et al.; Optimum Semiconductors for High-Power Electronics; IEEE Transaction on Electron Devices; vol. 36; Issue 9; Part 2; Sep. 1989; pp. 1811-1823.
Powerplant Fire Detection Instruments Thermal & Flame Contact Types (Reciprocating and Turbine Engine Powered Aircraft); Aerospace Standard; AS8028; Apr. 1980; 14 pages.
UK Search Report for GB1000600.5; May 6, 2010; 6 pages.
Capacitive Temperature Sensor Based on Thermal Expansion with Geometrical Amplification; Research Disclosure; 1996; vol. 386, No. 43; Accession No. 386043; 1 page.

* cited by examiner

*Primary Examiner* — R. A. Smith
(74) *Attorney, Agent, or Firm* — Armstrong Teasdale LLP

(57) ABSTRACT

A temperature sensor is described that includes a base, a first set of posts attached to the base having a first coefficient of thermal expansion, a second set of posts attached to the base and having a second coefficient of thermal expansion, and two substantially parallel conductive plates forming a capacitor. The first of the conductive plates is fixed to the first set of posts and the second of the conductive plates is fixed to the second set of posts. Temperature changes cause the first set of posts and the second set of posts to elongate at different rates, thereby changing a distance between the conductive plates and therefore the resulting capacitance. A system and method are also described for determining resonant frequency associated with the sensor which correlates to the temperature at the sensor when multiple sensors are networked across a system.

19 Claims, 5 Drawing Sheets

METHODS AND SYSTEMS FOR PASSIVE, WIRELESS TEMPERATURE MONITORING

BACKGROUND

The field of the disclosure relates generally to temperature monitoring, and more specifically, to methods and systems for electrically-based, passive, wireless temperature monitoring.

Pilots and maintenance personnel have a need to monitor a spatial distribution of temperature over the volume surrounding the engine core of a jet engine, for example. The operating temperatures in the engine core surrounding volume may range from about 100 degrees Fahrenheit to about 2000 degrees Fahrenheit. An ability to provide such a monitoring capability would lead to improved maintenance efficiency and provide an advance warning of potential engine malfunctions.

Current engine fire and overheat detection temperature sensors consist of long loops that respond to temperature changes with changes in pneumatic pressure, net loop resistance or net loop dielectric value. Systems of this type provide average dimensionless temperature "event" numbers. As such these systems do not provide a desired spatial resolution. These sensor systems also incorporate direct electrical connections. This is important since a substantial percentage of the weight of these current systems comes from the brackets and support structure needed for the electrical interconnections, so that the sensors loops survive the harsh vibrations encountered in such environments.

Electronic temperature sensors generally include, electromechanical devices (like traditional bimetal thermostats and the pneumatic tubes described above) which employ differential expansion of dissimilar metals or other materials usually activating a switch, and thermocouples which generate a voltage across an electrical contact between dissimilar metals proportional to temperature and the electronic work functions of the metals. Also included are thermistors which contain materials that have a large change in overall bulk electrical resistance with temperature. Band-gap type electronic thermometers which rely on voltage differences between semiconductor junctions operating at different current densities are also known.

In general, no semiconductor based electronic devices are available in a material system that will continue to operate up to the 2000 degree Fahrenheit temperature range mentioned above. For example, wide band gap materials like silicon carbide operate only up to around 1100 degrees Fahrenheit. Vacuum tube type electronics might be designed to operate up to 2000 degrees Fahrenheit, however such technology is not practical for low power miniaturized systems. Therefore the above described electromechanical and thermistor sensors are currently used in jet engine temperature monitoring.

Continuing, the electromechanical and thermistor engine temperature sensors in use today do not provide information on the spatial dependence of the temperature and therefore cannot be used to conclusively locate possible hot spots on the engine. Existing solutions also require wired connections to the sensors. Thermocouple, thermistor, and electromechanical type sensors cannot in general cover wide areas while also providing accurate measurement of localized hot spots. To address such issues, a large number of individual thermocouples, thermistors, or electromechanical sensors might be used. However such a solution would require a large number of wires or a mechanical switching network since an electronic multiplexing switch would not operate over the required temperature range. The end result is that such a system would be unacceptably heavy and complex.

Further, solid state infra-red imaging cameras cannot operate at the required temperatures, and moving them far enough away is also not mechanically practical. Vacuum tube cameras and supporting electronics are also not practical. A large number of cameras or observation points would be required to cover the entire engine surface. It might be possible to develop an optical or fiber-optical system to achieve coverage of the entire engine surface, but these would also not be practical or cost effective within the limited space.

BRIEF DESCRIPTION

In one aspect, a temperature sensor is provided that includes a base, a first set of posts attached to the base and having a first coefficient of thermal expansion, a second set of posts attached to the base and having a second coefficient of thermal expansion, and two substantially parallel conductive plates forming a capacitor. The first of the conductive plates is fixed to the first set of posts and the second of the conductive plates is fixed to the second set of posts. Temperature changes cause the first set of posts and the second set of posts to elongate at different rates thereby changing a distance between the conductive plates.

In another aspect, a method for monitoring temperature at individual locations across a structure is provided. The method includes deploying an interconnected array of temperature dependent sensors at the individual locations, exciting the array of sensors from at least one end of the array, determining a resonant frequency for each sensor in the array of sensors using a converging simulated mathematical model of the array of sensors, and generating a spatial temperature map for the structure based on the resonant frequency of the individual sensors in the array of sensors.

In still another aspect, a system for monitoring temperature at a plurality of locations is provided. The system includes an interconnected array of temperature dependent capacitive devices, at least one source for exciting the interconnected array, at least one receiver configured to determine a resonant frequency of the interconnected array, and a processing device. The processing device is programmed to determine a resonant frequency for each temperature dependent capacitive device using a converging simulated mathematical model of the interconnected array and generate a spatial temperature map for the plurality of locations based on the resonant frequency of the individual temperature dependent capacitive devices.

DETAILED DESCRIPTION

As can be ascertained from the above, it is desirable to have a passive temperature sensor that accurately and reliably responds to changes in temperature in harsh environments. Such a sensor would have an operating range at least from about from 100 degrees Fahrenheit to about 2000 degrees Fahrenheit. Such a sensor would also facilitate the monitoring of engine temperatures through the incorporation of wireless radio frequency signals rather than a direct wired connection. A wireless communication system is lighter in weight than the conventional monitoring systems. Wired systems are heavier, more complicated to install, more costly to maintain, and more susceptible to failure over time.

Existing RFID methods use both active semiconductor based electronics, and passive inductor capacitor (LC) resonators. The active methods use either a local transmitter, or a semiconductor switch to modulate the RF energy backscattered from the sensor device. All of the methods using active semi-conductor based electronics are not practical in the aircraft engine temperature monitoring application due to the high temperatures involved. The passive methods typically detect a single LC resonator excited by a rapid step in a static magnetic field.

Although an LC resonator can be configured for operation in a high temperature environment, it is difficult to detect a large number of separate resonators and resolve the unique condition of each one. A number of resonators widely spaced in frequency could be used with ordinary RFID magnetic step excitation. However, there are still problems to overcome as they would have to be spaced relatively far apart so they do not strongly couple to each other, and result in an overlap in frequencies. Wide frequency spacing and the properties of pulses in general equate to a wide bandwidth for the magnetic step.

Figure 1:
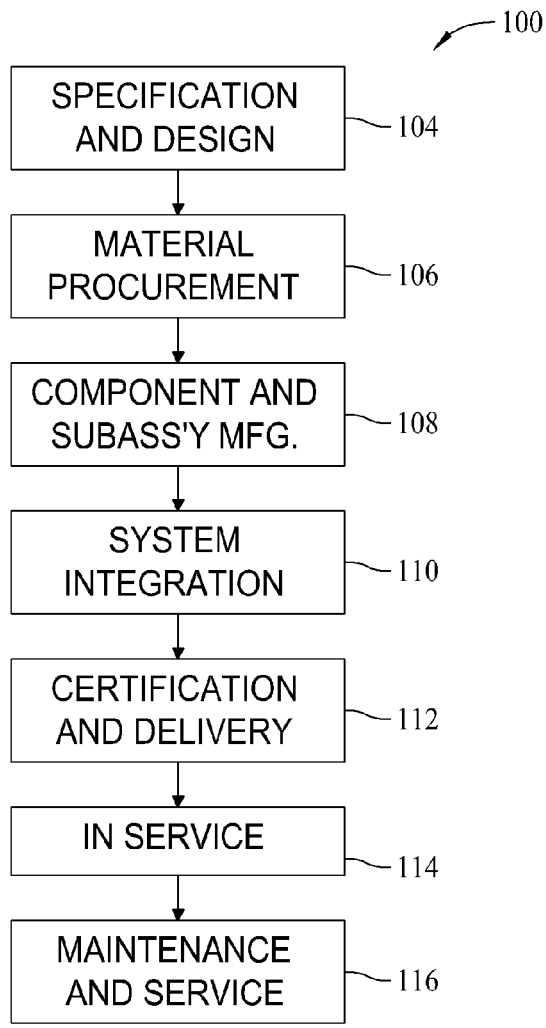
FIG. 1 is a flow diagram of an aircraft production and service methodology.
Figure 2:
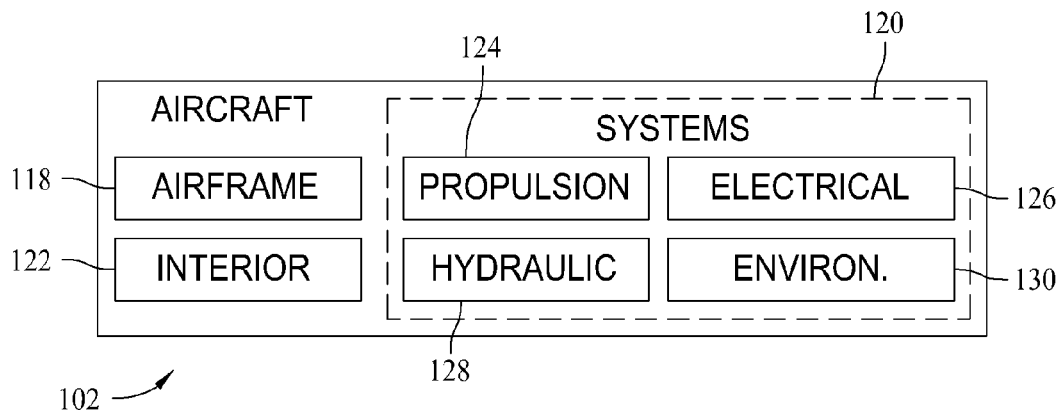
FIG. 2 is a block diagram of an aircraft.

Referring more particularly to the drawings, embodiments of the disclosure may be described in the context of aircraft manufacturing and service method 100 as shown in FIG. 1 and an aircraft 102 as shown in FIG. 2. During pre-production, aircraft manufacturing and service method 100 may include specification and design 104 of aircraft 102 and material procurement 106.]

During production, component and subassembly manufacturing 108 and system integration 110 of aircraft 102 takes place. Thereafter, aircraft 102 may go through certification and delivery 112 in order to be placed in service 114. While in service by a customer, aircraft 102 is scheduled for routine maintenance and service 116 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

As shown in FIG. 2, aircraft 102 produced by aircraft manufacturing and service method 100 may include airframe 118 with a plurality of systems 120 and interior 122. Examples of systems 120 include one or more of propulsion system 124, electrical system 126, hydraulic system 128, and environmental system 130. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 108 may be fabricated or manufactured in a manner similar to components or subassemblies produced while aircraft 102 is in service.

Also, one or more of apparatus embodiments, method embodiments, or a combination thereof may be utilized during component and subassembly manufacturing 108 and system integration 110, for example, without limitation, by substantially expediting assembly of or reducing the cost of aircraft 102. Similarly, one or more of apparatus embodiments, method embodiments, or a combination thereof may be utilized while aircraft 102 is in service, for example, without limitation, during system integration 110 and/or maintenance and service 116 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
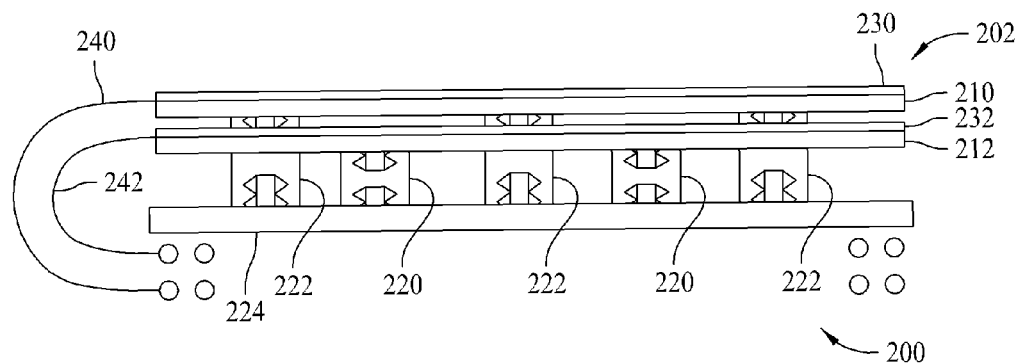
FIG. 3 is a side view cross section of a sensor.

Turning now to FIG. 3, a sensor 200 is depicted in side view cross section. Sensor 200 includes a temperature-dependent capacitor 202 and a fixed air-core inductor (not shown). The inductor is made up of a metallic wire, such as gold-plated copper wire, coiled around a grooved cylindrical housing of the same cross-section as the capacitor 202 and mounted underneath the capacitor 202. It is connected to the capacitor to form an inductor capacitor circuit. Temperature dependence is accomplished by supporting the two capacitor plates 210, 212, on posts 220, 222 having different coefficients of thermal expansion. In the illustrated embodiment, molybdenum and stainless steel alloy are used to fabricate the respective posts 220, 222 to provide the differential expansion as further described below. The resonant frequency of the sensor is given by $f_{res}=1/(2\pi \times sqrt(L \times C))$. As the sensor temperature increases, the capacitance decreases almost linearly, providing temperature data through measurement of the resonant frequency.

In the illustrated embodiment, capacitor plate 210 is fabricated as an Alumina printed circuit board with a gold cladding layer 230, with a nominal thickness of about 0.01 inches. Capacitor plate 212 is fabricated in the same fashion, however with a thickness of about 0.1 inches and a gold cladding layer 232. The posts 220 and 222 are attached to an alumina base 224 that has a thickness of about 0.1 inch. Posts 220 are, in the illustrated embodiment, fabricated from molybdenum and posts 222 are fabricated from a stainless steel alloy. Circuit leads 240 and 242 extend from the respective plates 210 and 212 for connection to the inductor.

The ability to read sensor 200 remotely by radio frequency signal can be accomplished by exciting, through inductive coupling, an array of sensors that are coupled with series capacitors and located inside the nacelle in the region for which temperature data are desired. The excitation signal is coupled into each end of the sensor array with a non-contacting loop antenna. The passive temperature sensor 200 is capable of operating reliably in temperatures that range from about 100 degrees Fahrenheit to about 2000 degrees Fahrenheit and can be interrogated to accurately determine temperature over the same temperature range. Sensor 200, as is explained further below, is part of a wireless temperature monitoring system which is capable of interrogating multiple sensors 200. The sensors 200 provide passive, interconnected resonant circuits whose resonant frequencies can be utilized to create a report of the local temperature as a function of position. Using mathematical algorithms, a position of the individual sensors 200 that are exhibiting a temperature-based characteristic can be determined.

As is further described herein, distribution of sensors 200 over a jet engine nacelle along with the incorporation of wireless methods results in a system operable to report a spatial distribution of temperature over the volume surrounding a jet aircraft engine, with good accuracy, over a wide temperature range.

Figure 4:
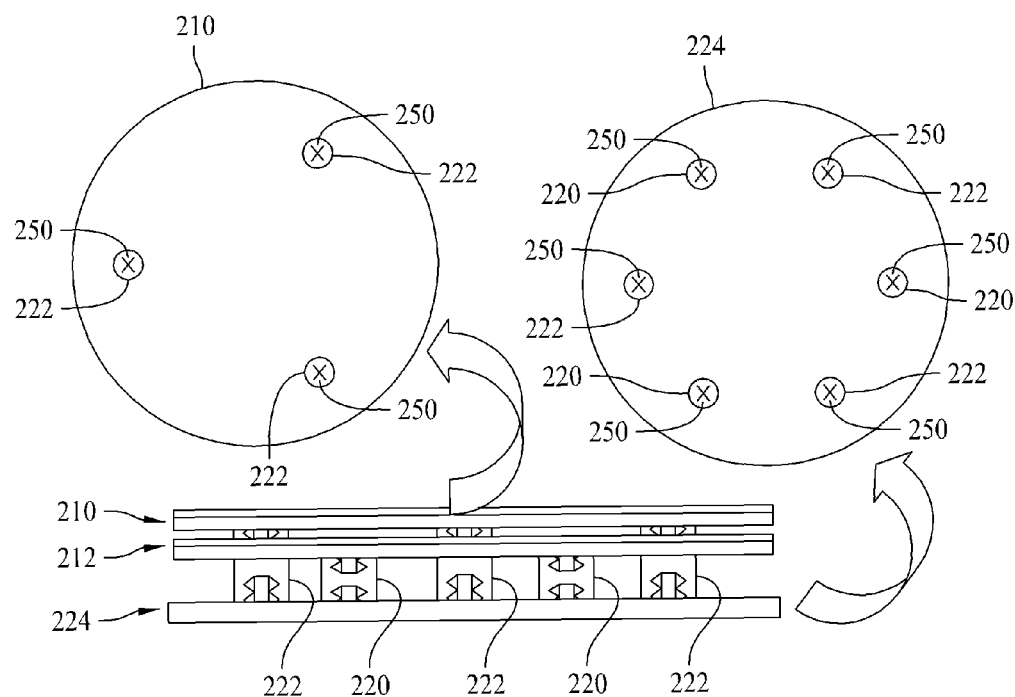
FIG. 4 illustrates the attachment of posts to a plate and a base to form a portion of the sensor of FIG. 3.

FIG. 4 illustrates details relating to the attachment of posts 220 and 222 to plate 210 and base 224. Individual posts 220 are attached to plate 224, for example, using a threaded fastener 250. As is described in further detail with respect to FIG. 5, only the stainless steel alloy posts 222 are attached to plate 210, again using a type of fastener such as a threaded fastener 250.

Figure 5:
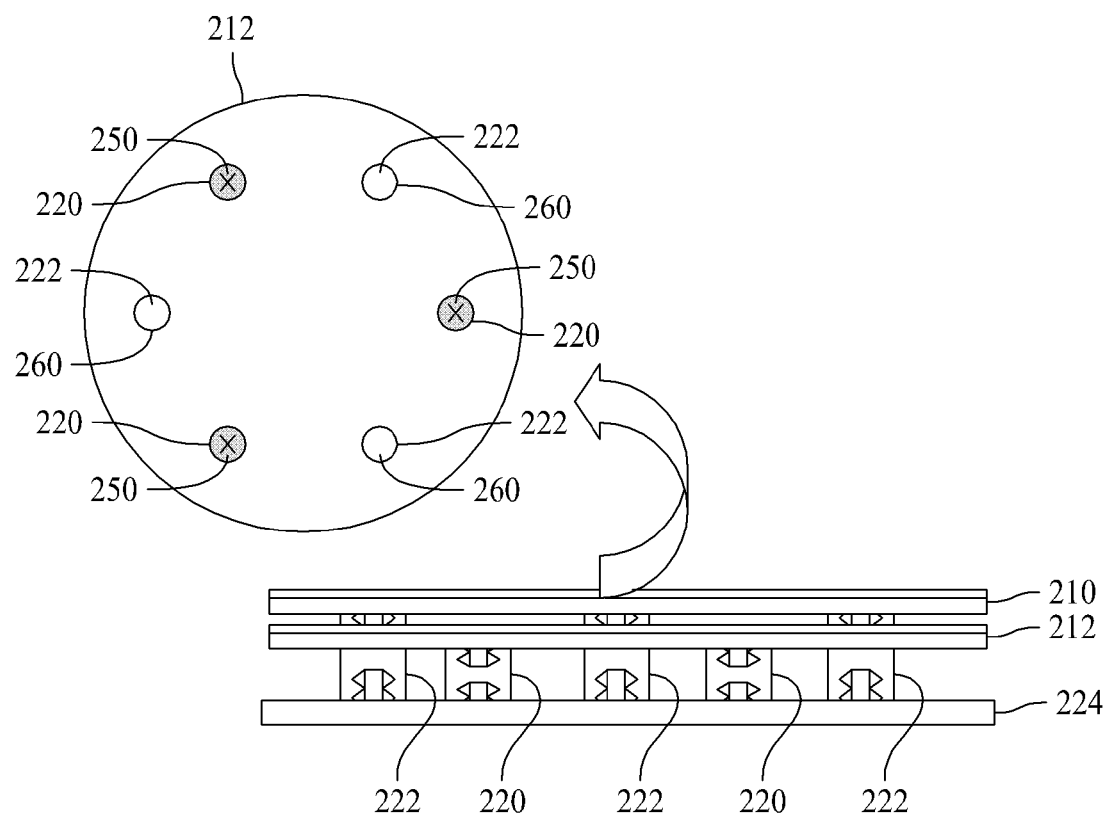
FIG. 5 illustrates that one plate of the sensor of FIG. 3 is attached to the base using molybdenum posts.

FIG. 5 illustrates that plate 212 is attached to the molybdenum posts 220, for example, using the above mentioned fasteners 250. The plate 212 may incorporate countersinking features for insertion of the fasteners 250, to enable the plates 210 and 212 to fit tightly together at the minimum temperature of about 100 degrees Fahrenheit and provide the correct baseline resonant frequency. Due to the holes 260 formed in plate 212, the stainless steel alloy posts 222 are free to move with respect to plate 212, and thus plate 210 can move along with the posts relative to plate 212, changing capacitance. The net effect is that the position of plate 210 is determined by the stainless steel posts 222 while that of plate 212 is determined by the Molybdenum posts 220. Temperature changes affect the stainless steel alloy posts 222 more so than temperature does the molybdenum posts 220, thereby changing the distance between the plates 210 and 212.

In order for the sensor to provide sensitivity to temperature variations, the sensors 200 utilize differential thermal expansion of two dissimilar materials, for example stainless steel and Molybdenum, to increase the air gap between the two capacitor plates 210 and 212 as the temperature increases thereby reducing capacitance. The stainless steel posts 222 have a higher CTE (coefficient of thermal expansion) and protrude through the lower plate 212 and attach to the upper plate 210. As described and in one embodiment, plate 210 is 0.010" thick alumina metallized on the upper side. The lower metallized plate 212 is attached to Molybdenum posts 220. At a low initial temperature, along the order of 100 degrees Fahrenheit, the two plates 210 and 212 are in contact with one another and the capacitance is determined by the 0.010" thick alumina layer. As temperature increases, the stainless posts 222 expand more than the Molybdenum posts 220, introducing an air gap. Since alumina has a high dielectric constant, this lowers the capacitance significantly, thereby raising the resonant frequency of the sensor 200, since resonant frequency of the temperature sensor is given by $f_{res}=1/(2\pi \times \text{sqrt}(L \times C))$.

The resulting situation is that the resonant frequency of each individual sensor 200 is uniquely determined by the local temperature. The individual resonant frequencies of the sensors in the array are obtained from the net response of the array by iteratively adjusting capacitor values in an equivalent circuit. This temperature-dependent change of distance between the conductive plates produces a corresponding change in the capacitance between the plates. In combination with a fixed inductor, the circuit then has a resonant frequency which is a function of temperature, thereby enabling temperature readings through knowledge of the resonant frequency.

The capacitive elements (e.g., sensors 200) described with respect to FIGS. 3-5 provide a portion of a passive, electrically-based method for determining the local temperature at designated sites throughout a spatial volume. In one embodiment, this spatial volume is the area surrounding a jet engine. In one application, a number of sensors 200 are arranged in an array over the region for which the temperature is to be monitored. Temperature readings are obtained in one embodiment by recording the overall frequency response of the array of sensors 200 and calculating the frequency at which each circuit resonates by computer optimization of the parameters in an equivalent circuit. The ambient temperature of each sensor 200 uniquely determines its resonant frequency. The passive design of sensor 200 allows it to function in harsh environments, such as high temperature, without component failure.

Figure 7:
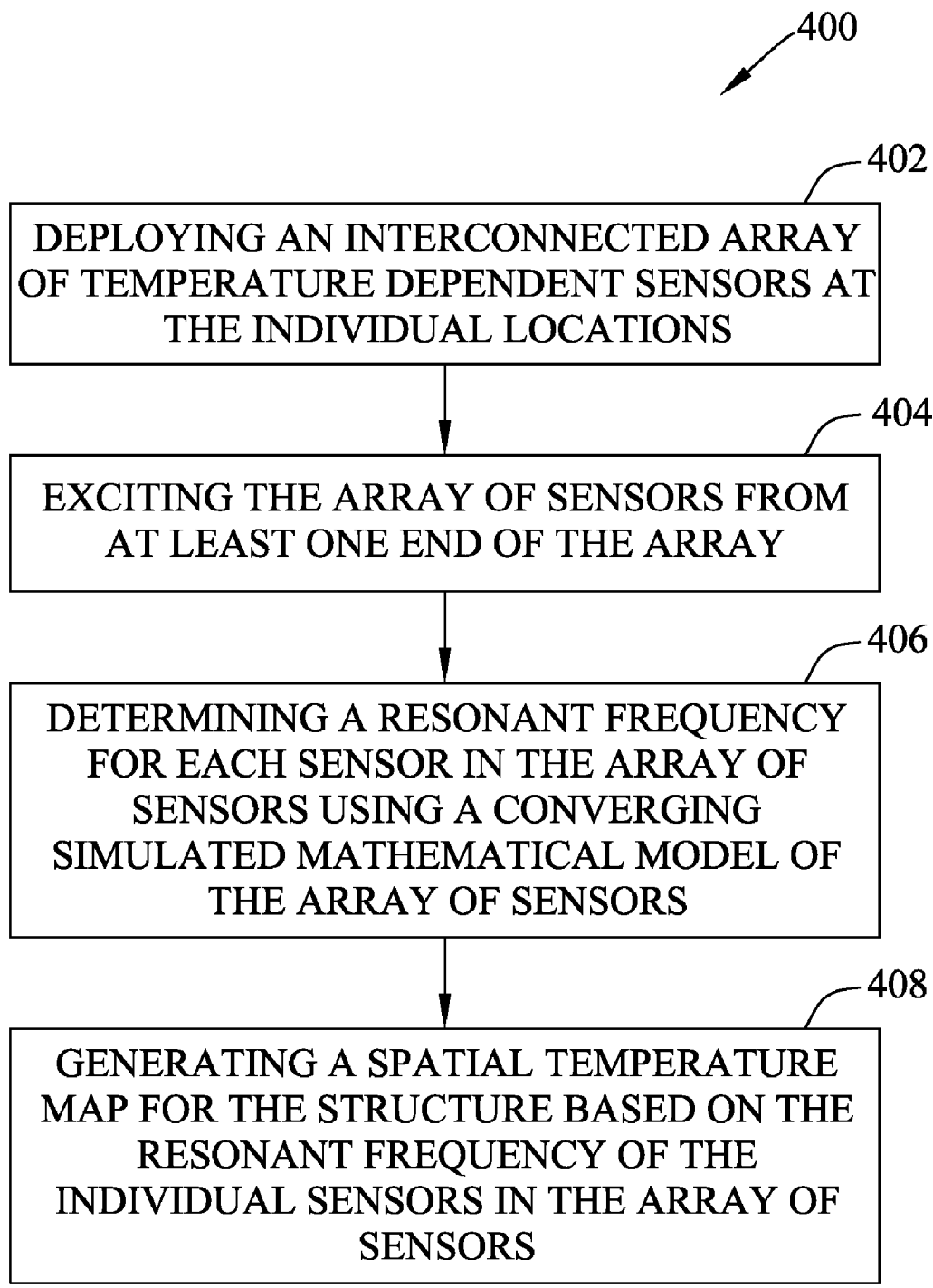
FIG. 7 is a flowchart illustrating a method for monitoring temperature at individual locations across a structure.

FIG. 7 is a flowchart 400 illustrating a method for monitoring temperature at individual locations across a structure using the embodiments described herein. In the method, an interconnected array of temperature dependent sensors 200 are deployed 402 at the individual locations, and the array of sensors 200 is excited 404 from at least one end of the array. A resonant frequency for each sensor 200 in the array of sensors is determined 406 using a converging simulated mathematical model of the array of sensors and a spatial temperature map is generated 408 for the structure based on the resonant frequency of the individual sensors 200 in the array of sensors.

The embodiments further provide a method for wirelessly interrogating an array of temperature sensing resonators suitable for operation in extreme environments, along with a methodology for determining the temperature at each sensor. Accurate temperature data at designated sites is provided throughout the spatial volume surrounding the engine. Temperature readings are obtained by recording the overall frequency response of the array and calculating the frequency at which each circuit resonates by computer optimization of the parameters in an equivalent circuit. The resonator capacitance is designed to vary approximately linearly with temperature, through the differential expansion of its structural components.

The resonant frequency of each sensor 200 in the network is a unique identifier of the local temperature. This frequency/temperature information is transmitted accurately and without distortion. This operation is contrasted against at least some known systems in which the existing thermistor/loop sensor or pneumatic switch sensor provides a spatial average of the temperature over its entire length and therefore provides no indication of local hot spots. An array of sensors 200 provides temperature information as a function of position in the volume around the engine.

The methodology associated with sensors 200 provide for a wireless communications connection while also providing temperature information as a function of position in the volume around an engine. Further, any problems associated with the isolation of the sensors 200 is eliminated by building a system that can maintain accuracy while the sensors are deliberately coupled. In addition, problems associated with electromagnetic interference, as generated from the wideband magnetic step, are eliminated because an instantaneously very narrow-band frequency sweep of relatively low power is used for the interrogation of the sensors 200. As the frequency is swept over the desired range, the narrow instantaneous bandwidth prevents corruption of the signal by rejecting broadband noise emissions in the engine environment.

The described embodiments provide a sensor 200 capable of operating in extreme environments in which the individual condition of a large number of sensors can be determined through a very small number of wired or wireless connection points. When installed inside an engine nacelle, sensors 200 provide accurate temperature data for the various sensor installation sites. In one embodiment, the spacing between individual sensors 200 is about one foot from sensor-to-sensor. In one of the described embodiments, temperature accuracy has been found to be about +/−4 degrees Fahrenheit, over the range of about 100-2000 degrees Fahrenheit, though it is conceivable to configure the described embodiments for other tolerances.

While described in terms of jet engine temperature monitoring, applications associated with the described embodiments are not so limited. In addition, sensors 200 are contemplated to be useful in other applications that require monitoring of high temperature over wide areas. Examples include furnaces for bending and tempering sheets of glass as well as other extreme environments, such as environments where ordinary semiconductor electronics might not function or where complex wiring is not practical. Such examples include extremely low temperature cryogenic environments, chemical solutions including fuel tanks, and environments of intense radiation in nuclear applications.

The sensors 200 are easily modified to measure pressure, mechanical strain, or a change in capacitance due to relative overlap of the plates due to a change in mechanical position. In addition, the presence, level, type or purity of a dielectric fluid in a container or tank is detectable (for example water in jet fuel). The inductor in the sensor could also be modified to become a transducer, for example, as a mechanical position sensor by moving a ferrite core more or less inside the coil of wire, or compressing and expanding the coils.

Figure 6:
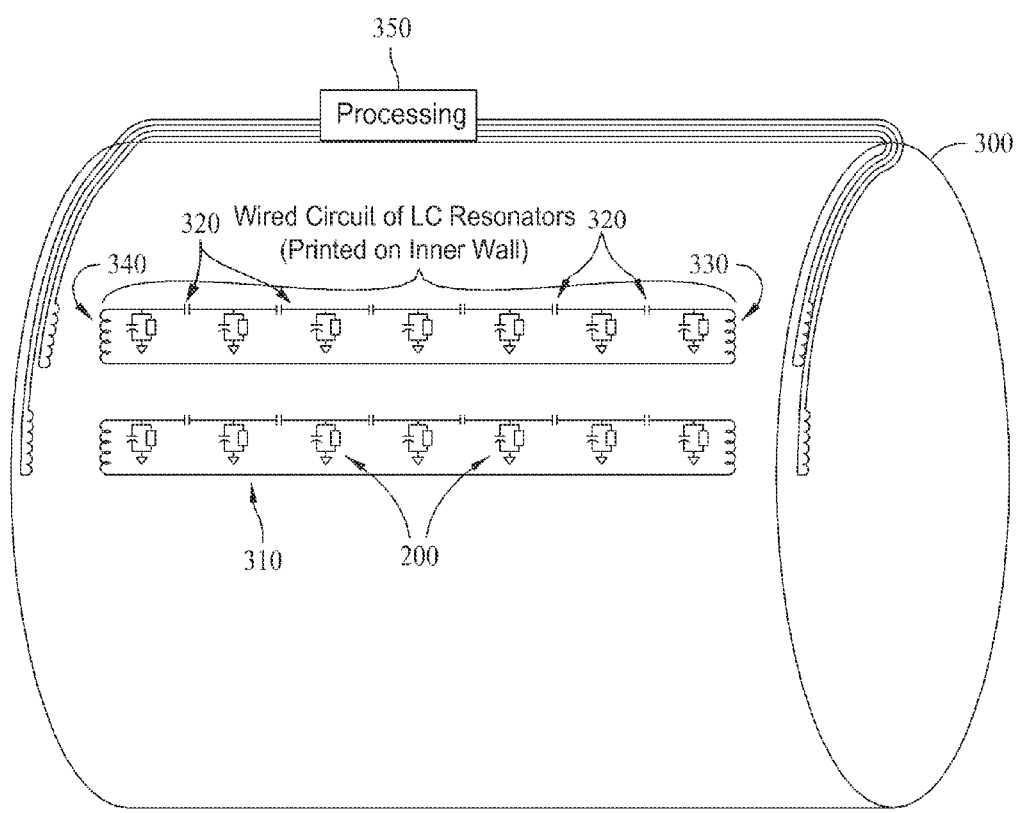
FIG. 6 is an illustration depicting a plurality of the sensors of FIG. 3 deployed as a network within an aircraft engine.

FIG. 6 is an illustration of a jet engine core 300 having an inner wall that includes a network 310 of interconnected resonant circuits. The resonant circuits consist of sensors 200 coupled to one another via coupling capacitors 320. Each sensor 200 includes, as described above, a capacitor dependent on the local temperature. Wireless transmission ports 330 and 340 are included for the wireless transmission of the resonant frequencies to a receiving interrogator unit 350.

Referring still to FIG. 6, the sensors 200 are interconnected in the topology of a band-pass filter although the traditional values of the components that would be used in a filter design are not used because it is easier to determine an individual resonator's capacitor value if the spacing between the resonator frequencies is larger than in a normal filter design. In the illustrated embodiment, resonators in the band-pass filter topology are connected with high side capacitors 320. However, inductive coupling is theoretically equivalent forming the basis for the wireless coupling elements at the network boundaries. Further, it should be observed that the resonators will appear to have slightly different frequencies even if they are exactly the same because of their slightly different positions in the overall network and the fact that they interact with each other. The deliberate coupling of the resonators allows a low power, band limited signal to interrogate them all with high accuracy.

The result is that the resonant frequency of each individual resonator (sensor 200) is a function of the temperature driven capacitor values of all of the resonators due to the interaction through the high side coupling capacitors. The determination of the individual values is obtained from the network response by iteratively adjusting capacitor values in an equivalent circuit until a convergence criteria is met. In one embodiment, this operation is accomplished using blind optimization of the values in a gradient method, or by using a data-based method where a large number of possible values are exhaustively iterated. A combination of data based determination of a starting point and gradient optimization to fine tune the solution can also be used. A closed form mathematical solution to calculate the capacitor values may also be derived from the amplitude and phase of the response over a sufficient number of frequencies although such a solution is likely more cumbersome than iterative methods, especially as the number of sensors within a system becomes large.

The frequency response of the network 310 used to determine the capacitor values of the individual sensors 200 includes the forward transmission between two interrogation points and the input impedance, or reflected power at both interrogation ports. For a small number of sensors it is possible to monitor just the input impedance at one interrogation port. However, as the number of sensors 200 increases within a network, more information is required to insure the system parameters are uniquely defined and therefore information from both ports is utilized.

At least one embodiment takes the form of a string of resonators with input and output measurement ports, or a two dimensional array of resonators with measurement ports at the four corners and additional ports as required along the edge or elsewhere to acquire enough data to determine the values of all of the resonators. In the case of a linear resonator string, the path of the string can be meandered and turned back on itself to locate resonators arbitrarily in a three dimensional space.

The coupling capacitors 320 are not purposely designed to change their capacitance value with temperature although any change in capacitance value does not influence network operation since these coupling capacitors are located close in proximity to one of the temperature dependent capacitors within sensor 200. More specifically, when a particular value for the temperature dependent resonator capacitor is used in an iterative method, the coupling capacitor has a corresponding value that should be used since their capacitance values should track over a temperature range. This tracking should also apply to unexpected temperature dependent changes to the inductor which are calibrated out since every resonator capacitor value tried in the optimization implies a temperature and the characteristics of the inductor and coupling capacitor over temperature could be known from a previous calibration.

The above described embodiments provide cost savings on engine maintenance by reducing the frequency and duration of shop visits through the enabling of a system which provides more accurate temperature data. Through such embodiments, there is a significant opportunity to prevent economic damage to composite structures by providing accurate health monitoring of these structures. More precise overheat and fire detection capabilities also result with accurate spatial resolution of temperature, allowing different alarm points to be specified for different regions and operating conditions. With a high density of sensors, localized heating events (hot jets) can be more readily detected, whereas these events can be difficult to detect with existing fire detection technologies. Further, certain embodiments also save cost on the installation and maintenance of the sensor network, which may be installed underneath the thrust reverser instead of just above the engine core, and will be a significantly lighter system. The system provides additional reliability due to the passive nature of the sensors thereby reducing in-service faults and false indications. Additionally, the health monitoring capabilities can be incorporated into a total care package to offer maintenance planning benefit to airlines and other entities which would utilize the above described embodiments.

Simulation results for a one dimensional sensor array and for a two dimensional array have been generated and validate that multiple unknown capacitor values can be converged upon using a gradient optimization of the equivalent circuit to match the transmission and reflection of the sensor array. The simulations also indicate that the easiest way to graphically see the resonant frequency of an individual resonator in the overall response of the coupled array is to display the group delay which is the derivative of phase with respect to frequency. An iterative solution may also be calculated.

This written description uses examples to disclose the various embodiments, including the best mode, to enable any person skilled in the art to practice the embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A temperature sensor comprising:
   a base;
   a first set of posts attached to said base and having a first coefficient of thermal expansion;
   a second set of posts attached to said base and having a second coefficient of thermal expansion; and
   two substantially parallel conductive plates forming a capacitor, wherein a first of said conductive plates is fixed to said first set of posts and a second of said conductive plates is fixed to said second set of posts, and wherein temperature changes cause said first set of posts and said second set of posts to elongate at different rates thereby changing a distance between said conductive plates.

2. A temperature sensor according to claim 1 wherein the first of said conductive plates comprises a set of holes therethrough, said second set of posts elongated to pass through said holes.

3. A temperature sensor according to claim 2 wherein:
   said first set of posts comprise molybdenum; and
   said second set of posts comprise a stainless steel alloy.

4. A temperature sensor according to claim 1 wherein temperature data is determined through measurement of the resonant frequency of said temperature sensor.

5. A temperature sensor according to claim 4 wherein the resonant frequency of said temperature sensor is given by $f_{res}=1/(2\pi \times sqrt(L \times C))$.

6. A temperature sensor according to claim 1 wherein said two substantially parallel conductive plates comprise alumina printed circuit boards further comprising a gold cladding layer.

7. A method for monitoring temperature at individual locations across a structure, said method comprising:
   deploying an interconnected array of temperature dependent sensors at the individual locations;
   exciting the array of sensors from at least one end of the array;
   determining a resonant frequency for each sensor in the array of sensors using a converging simulated mathematical model of the array of sensors; and
   generating a spatial temperature map for the structure based on the resonant frequency of the individual sensors in the array of sensors.

8. A method according to claim 7 wherein determining a resonant frequency for each sensor in the array of sensors comprises iteratively adjusting capacitor values in an equivalent circuit to the array of sensors.

9. A method according to claim 7 wherein deploying an interconnected array of temperature dependent sensors comprises deploying multiple capacitance based temperature sensor circuits.

10. A method according to claim 9 wherein deploying multiple capacitance based temperature sensor circuits comprises deploying two substantially parallel conductive plates forming a capacitor for each sensor of the array, one of the said conductive plates are fixed to a first set of posts having a first coefficient of thermal expansion and a second of the conductive plates are fixed to a second set of posts having a second coefficient of thermal expansion.

11. A method according to claim 7 wherein determining a resonant frequency for each sensor in the array of sensors using a converging simulated mathematical model comprises calculating the frequency at which each sensor in the array resonates by computer optimization of the parameters in an equivalent circuit, the ambient temperature of each sensor determining its resonant frequency.

12. A method according to claim 7 wherein determining a resonant frequency for each sensor in the array of sensors comprises:
   exciting the array of sensors from the one end of the array; and
   reading the generated resonant signals from both ends of the array of sensors.

13. A system for monitoring temperature at a plurality of locations, said system comprising:
   an interconnected array of temperature dependent capacitive devices;
   at least one source for exciting said interconnected array;
   at least one receiver configured to determine a resonant frequency of said interconnected array; and
   a processing device, said processing device programmed to determine a resonant frequency for each temperature dependent capacitive device using a converging simulated mathematical model of the interconnected array and generate a spatial temperature map for the plurality of locations based on the resonant frequency of the individual temperature dependent capacitive devices.

14. A system according to claim 13 wherein each temperature dependent capacitive device comprises:
   a base;
   a first set of posts attached to said base and having a first coefficient of thermal expansion;
   a second set of posts attached to said base and having a second coefficient of thermal expansion; and
   two substantially parallel conductive plates forming a capacitor, wherein a first of said conductive plates are fixed to said first set of posts and a second of said conductive plates are fixed to said second set of posts, wherein temperature changes cause said first set of posts and said second set of posts to elongate differently thereby changing a distance between said conductive plates.

15. A system according to claim 14 wherein the first of said conductive plates comprises a set of holes therethrough, said second set of posts elongated to pass through said holes.

16. A system according to claim 15 wherein:
   said first set of posts comprise molybdenum; and said second set of posts comprise a stainless steel alloy.

17. A system according to claim 14 wherein said two substantially parallel conductive plates comprise alumina printed circuit boards further comprising a gold cladding layer.

18. A system according to claim 13 wherein said processing device is configured to determine a resonant frequency for each temperature dependent capacitive device in the array by iteratively adjusting capacitor values in an equivalent circuit to the array of capacitive devices.

19. A system according to claim 13 wherein said processing device is configured to calculate a frequency at which each temperature dependent capacitive device in the array resonates by computer optimization of the parameters in an equivalent circuit, the ambient temperature of each temperature dependent capacitive device in the array determining its resonant frequency.

\* \* \* \* \*